Nov. 20, 1934.   J. G. McNALLY   1,981,425
SUBSTRATUM FOR PHOTOGRAPHIC ELEMENTS
Filed Sept. 27, 1932
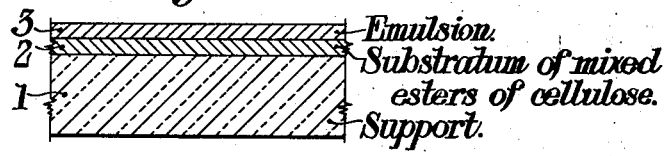
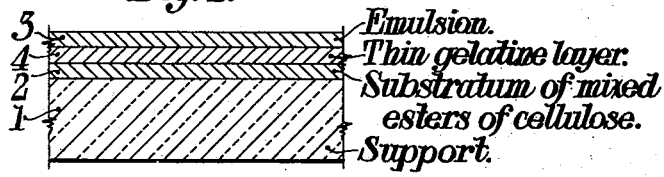
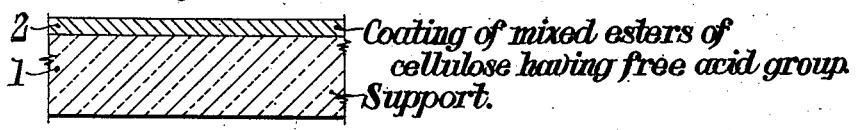
Inventor:
James G. McNally, Patented Nov. 20, 1934

1,981,425

UNITED STATES PATENT OFFICE 1,981,425

SUBSTRATUM FOR PHOTOGRAPHIC ELEMENTS

James G. McNally, Rochester, N. Y., assignor to Eastman Kodak Company, Rochester, N. Y., a corporation of New York Application September 27, 1932, Serial No. 635,053

15 Claims. (Cl. 95—9)

This invention relates to photographic elements and particularly to a novel and useful material to be applied between a suitable support and an emulsion layer to bring about better adhesion between the two.

When supports such as glass or sheets of cellulose derivatives are to be coated with a gelatino-silver halide emulsion it is usually necessary and desirable to first apply to the support a very thin layer, usually referred to as a substratum, of some material which will increase the adhesion between the support and the emulsion. In the past, gelatin solutions of various kinds, albumen, and other materials, have been used for this purpose. More recently, a number of other substances, such as certain cellulose esters, resins, and the like have been proposed. None of these substances, however, has had outstanding superiority nor utility.

In the following specification reference is made to the drawing in which each of the three figures illustrates one form of my invention.

I have found a class of substances which possesses many of the requisite characteristics, such as the production of firm adhesion, convenience in application, and suitable properties after coating. These substances are the mixed esters of cellulose having a free acid group. Most of these substances have been described and prepared only within the last few years. The following explanation will make clearer the nature of these compounds.

The substances which I use are double or mixed esters of cellulose in which a part of the cellulose molecule is substituted or esterified by one acid and another part of the molecule is substituted by another acid, at least one of these substitutions resulting in a free acid (carboxyl) group. Such mixed esters are, for example, conveniently prepared which contain the cellulose substituted with a saturated lower fatty acid such as acetic, and a dicarboxylic acid, such as phthalic acid, succinic acid, or diglycollic acid. These substances are mentioned by way of example only. The preparation of these mixed esters is fully described in the copending application of C. J. Malen and C. E. Waring, Serial No. 380,252, filed July 22, 1929.

The structure of several of these useful substances in the light of present knowledge may be given as follows. In these formulas each $C_6H_{10}O_5$ unit of the cellulose molecule is represented by

Particularly useful compounds are cellulose acetate phthalate, cellulose acetate succinate, and cellulose acetate diglycollate. These may be represented conventionally by the structural formulas:

Cellulose acetate phthalate

Cellulose acetate succinate

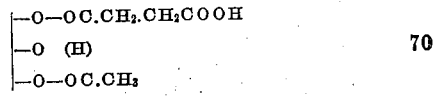

Cellulose acetate diglycollate

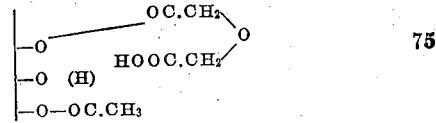

In these formulas the hydrogen of the middle OH group is in each case shown within dotted brackets. This is to indicate that this hydroxyl group may be esterified or substituted by either of the two acid groups. Consequently, the resulting product may contain a varying percentage of acetyl or phthalyl, for example, in the first case, or of the corresponding groups in other compounds.

It is to be particularly noted that each of these formulas contains a free acid or carboxyl group (—COOH). It is this free acid group which appears to be important in forming a link between the cellulose molecule and surfaces such as glass and gelatin.

Still further examples of these mixed esters having a free acid group are cellulose acetate citrate and cellulose acetate tartrate.

In using these materials, I dissolve the mixed esters described in a suitable organic solvent and coat the resulting solution directly on a support such as cellulose acetate, cellulose nitrate, other cellulose derivative, or glass. The coating is dried and is then preferably over-coated with a dilute solution of gelatin or its equivalent. The layer is then dried and coated with photographic emulsion in the usual manner.

The following are specific embodiments of my invention:

Example I

|  | Grams |
|---|---|
| Cellulose acetate phthalate | 3 |
| Ethyl acetate | 100 |

Example II

|  | Grams |
|---|---|
| Cellulose acetate phthalate | 4 |
| Ethyl acetate | 100 |
| Ethyl lactate | 20 |

Example III

|  | Grams |
|---|---|
| Cellulose acetate phthalate | 3 |
| Acetone | 70 |
| Methyl alcohol | 30 |

Example IV

|  | Grams |
|---|---|
| Cellulose acetate succinate | 3 |
| Ethyl acetate | 100 |
| Acetone | 30 |

Example V

|  | Grams |
|---|---|
| Cellulose acetate diglycollate | 3 |
| Ethyl acetate | 100 |
| Acetone | 30 |

Any of these solutions are useful in coating a substratum on a film support. They are particularly useful with cellulose acetate. Cellulose acetate sheets, for example, of about 0.005" in thickness are coated with one of these solutions either by application rolls on a coating machine or by immersion.

While good adhesion is obtained in most cases between the support thus coated and a gelatin emulsion layer as shown in Fig. 1, I prefer to overcoat the substratum of the cellulose mixed ester 2 with a dilute solution of gelatin, for example, a ½ to 1% solution of gelatin in water as shown in Fig. 2. Such a gelatin solution may have added to it acetic acid as a hardening agent and part of the water may be replaced by other solvents such as methyl alcohol and ethyl alcohol. The exact nature of this intermediate gelatin coating 4 is not important. After the gelatin coating has dried, the support is ready for coating the gelatino-silver halide emulsion 3 by the usual method.

For overcoating the cellulose ester substratum I may in certain cases use, instead of gelatin, casein, albumen or other common adhesives with or without the addition of such substances as glycerine, phenol, glucose, molasses, etc. As stated, the composition of this intermediate layer is not critical and it may be made in a wide variation of compositions.

While the substratum coating solutions which I have described are particularly useful for cellulose acetate, they are also of advantage with supports of other cellulose esters or ethers and with glass. Sheets of cellulose derivatives coated as shown in Fig. 3 would, for example, be useful in various arts where firm adhesion to such a sheet is desirable. Either one or both surfaces of the sheet may be coated with the mixed esters I have described, with or without other overcoated adhesive layers. Such a sheet coated on both sides may be employed for the making of laminated glass, as another instance.

It will be apparent to those skilled in the art that a large number of variations may be made in the solvents employed or in other features of the procedure. All such modifications and equivalents I consider as within my invention as expressed by the appended claims.

What I claim as my invention and desire to secure by Letters Patent of the United States is:

1. A photographic film comprising a support, a light-sensitive gelatino-halide layer and a firmly adhering substratum between the support and the light-sensitive layer comprising a mixed organic ester of cellulose having a free acid group.

2. A sensitive photographic element comprising a support, a substratum containing a mixed ester of cellulose having a free acid group, over the said substratum a thin coating of gelatin and over the gelatin coating a gelatino-silver halide emulsion layer.

3. A sensitive photographic element comprising a support of cellulose acetate, a substratum containing cellulose acetate phthalate, over the substratum a thin coating of gelatin, and over the gelatin coating a gelatino-silver halide emulsion layer.

4. A sensitive photographic element comprising a support of cellulose acetate, a substratum containing cellulose acetate succinate, over the substratum a thin coating of gelatin and over the gelatin coating a gelatino-silver halide emulsion layer.

5. A sensitive photographic element comprising a support of cellulose acetate, a substratum containing cellulose acetate diglycollate, over the substratum a thin coating of gelatin and over the gelatin coating a gelatino-silver halide emulsion layer.

6. An article of manufacture comprising a cellulosic support having at least one surface coated with a mixed ester of cellulose having a free acid group and then overcoated with a solution of an adhesive.

7. An article of manufacture comprising a support of cellulose acetate coated on at least one surface with a mixed ester of cellulose having a free acid group and then overcoated with gelatin.

8. A photographic film comprising a colloidized cellulose ester support, a light-sensitive gelatino-halide layer, and a firmly adhering substratum between the support and the light-sensitive layer comprising cellulose acetate phthalate.

9. A photographic film comprising a colloidized cellulose ester support, a light-sensitive gelatino-halide layer, and a firmly adhering substratum between the support and the light-sensitive layer comprising cellulose acetate succinate.

10. A photographic film comprising a colloidized cellulose ester support, a light-sensitive gelatino-halide layer, and a firmly adhering substratum between the support and the light-sensitive layer comprising cellulose acetate diglycollate.

11. A photographic film comprising a colloidized cellulose acetate support, a light-sensitive gelatino-halide layer, and a firmly adhering substratum between the support and the light-sensitive layer comprising cellulose acetate phthalate.

12. A photographic film comprising a colloidized cellulosic support, a light-sensitive gelatino-halide layer, a strongly adhering substratum between the support and the light-sensitive layer comprising a mixed organic ester of cellulose having a free acid group, and a thin layer of an adhesive between the substratum and the light-sensitive layer.

13. A photographic film comprising a colloidized cellulose ester support, a light-sensitive gelatino-halide layer, a strongly adhering substratum between the support and the light-sensitive layer comprising a mixed organic ester of cellulose having a free acid group, and an adhesive layer of gelatin between the substratum and the light-sensitive layer.

14. A photographic film comprising a colloidized cellulosic support, a light-sensitive gelatino-halide layer and a firmly adhering substratum between the support and the light-sensitive layer comprising a water-insoluble mixed organic ester of cellulose selected from the group consisting of cellulose acetate phthalate, cellulose acetate succinate, cellulose acetate diglycollate, cellulose acetate citrate, and cellulose acetate tartrate.

15. A photographic film comprising a colloidized cellulose ester support, a light-sensitive gelatino-halide layer and a firmly adhering substratum between the support and the light-sensitive layer comprising a water-insoluble mixed organic ester of cellulose selected from the group consisting of cellulose acetate phthalate, cellulose acetate succinate, cellulose acetate diglycollate, cellulose acetate citrate, and cellulose acetate tartrate.

JAMES G. McNALLY.